United States Patent
Schemmel et al.

(10) Patent No.: US 11,697,450 B2
(45) Date of Patent: Jul. 11, 2023

(54) HANDWHEEL ACTUATOR ASSEMBLY

(71) Applicants: ZF AUTOMOTIVE UK LIMITED, West Midlands (GB); ZF FRIEDRICHSHAFEN AG, Friedrichshafen (DE)

(72) Inventors: Lukas Schemmel, Wasserlosen (DE); David Julian Moule, Birmingham (GB); Russell Wilson-Jones, Stratford-upon-Avon (GB)

(73) Assignees: ZF AUTOMOTIVE UK LIMITED, West Midlands (GB); ZF FRIEDRICHSHAFEN AG, Friedrichshafen (DE)

( * ) Notice: Subject to any disclaimer, the term of this patent is extended or adjusted under 35 U.S.C. 154(b) by 228 days.

(21) Appl. No.: 16/770,710

(22) PCT Filed: Dec. 4, 2018

(86) PCT No.: PCT/GB2018/053517
§ 371 (c)(1),
(2) Date: Jun. 8, 2020

(87) PCT Pub. No.: WO2019/110985
PCT Pub. Date: Jun. 13, 2019

(65) Prior Publication Data
US 2021/0163061 A1    Jun. 3, 2021

(30) Foreign Application Priority Data
Dec. 6, 2017 (GB) ..................... 1720363

(51) Int. Cl.
*B62D 5/00* (2006.01)
*B60K 35/00* (2006.01)
(Continued)

(52) U.S. Cl.
CPC ............. *B62D 5/006* (2013.01); *B60K 35/00* (2013.01); *B60R 16/0207* (2013.01); *B62D 1/105* (2013.01); *B60K 2370/16* (2019.05)

(58) Field of Classification Search
CPC .......... B62D 5/006; B62D 5/04; B62D 1/105; B62D 5/0415; B60B 27/0068;
(Continued)

(56) References Cited

U.S. PATENT DOCUMENTS

| 6,557,662 B1 | 5/2003 | Andonian et al. |
| 2007/0209858 A1 | 9/2007 | Gulde |

(Continued)

FOREIGN PATENT DOCUMENTS

| CN | 103490577 A * | 1/2014 | ............ H02K 1/17 |
| CN | 205178681 | 4/2016 | |

(Continued)

OTHER PUBLICATIONS

Characteristic Analysis of Surface Permanent-Magnet Vernier Motor According to Pole Ratio and Winding Pole Number, published May 8, 2017 (Year: 2017).*

*Primary Examiner* — Yuri Kan
(74) *Attorney, Agent, or Firm* — Tarolli, Sundheim, Covell & Tummino L.L.P (57) ABSTRACT

A handwheel actuator assembly 600 for a steer by wire steering system of a vehicle is disclosed. The assembly 600 comprises a steering wheel 601 and a feedback torque generator. The steering wheel 601 has at least one hand grip portion rotatable around an axis of rotation of the steering wheel 601 which can be gripped by a driver and a hub 602 that supports the hand grip portion. The feedback torque generator comprises an electric motor which has a stator 609 and a rotor 610. The rotor 610 is directly or indirectly fixed to and rotates with the hub of the steering wheel 601 and the stator 609 is secured to a fixed part of the vehicle body such that it cannot rotate relative to the vehicle body. The motor comprises a brushless permanent magnet Vernier motor.

20 Claims, 10 Drawing Sheets

(51) Int. Cl.
  *B60R 16/02*   (2006.01)
  *B62D 1/10*    (2006.01)
(58) Field of Classification Search
  CPC .......... H02K 1/141; H02K 1/27; H02K 21/22;
         H02K 1/17; H02K 1/146; H02K 16/04;
         H02K 37/06; F16D 43/20206
  See application file for complete search history.

(56) References Cited

U.S. PATENT DOCUMENTS

| | | | | |
|---|---|---|---|---|
| 2015/0108823 | A1* | 4/2015 | Figuered | B60B 27/0068 |
| | | | | 301/6.5 |
| 2016/0039454 | A1* | 2/2016 | Mortimer | B62D 5/0415 |
| | | | | 701/41 |
| 2017/0029013 | A1 | 2/2017 | Oya | |
| 2020/0303973 | A1* | 9/2020 | Kang | H02K 21/22 |

FOREIGN PATENT DOCUMENTS

| | | | | | |
|---|---|---|---|---|---|
| CN | 106602823 | A | * | 4/2017 | ............. H02K 1/146 |
| CN | 105391202 | B | * | 4/2019 | ............... H02K 1/22 |
| DE | 10221242 | | | 11/2003 | |
| FR | 2479506 | A1 | * | 10/1980 | ......... F16D 43/2026 |
| JP | 2003267234 | | | 9/2003 | |
| JP | 2003267234 | A | * | 9/2003 | ............... B62D 5/04 |
| JP | 2003348809 | A | * | 12/2003 | ............... H02K 1/27 |
| JP | 2020080607 | A | * | 5/2020 | ............. H02K 16/04 |
| WO | WO-9103098 | A1 | * | 3/1991 | ............. H02K 37/06 |
| WO | WO-2005102815 | A1 | * | 11/2005 | ............. B62D 1/105 |
| WO | 2009007571 | | | 1/2009 | |
| WO | 2009063818 | | | 5/2009 | |
| WO | WO-2009063818 | A1 | * | 5/2009 | ............. B62D 1/105 |
| WO | WO-2014020273 | A1 | * | 2/2014 | ............. H02K 1/141 |

* cited by examiner

HANDWHEEL ACTUATOR ASSEMBLY

RELATED APPLICATIONS

This application corresponds to PCT/GB2018/053517, filed Dec. 4, 2018, which claims the benefit of British Application No. 1720363.9, filed Dec. 6, 2017, the subject matter, of which are incorporated herein by reference in their entireties.

This invention relates to handwheel actuator assembly for a vehicle steer by wire steering system.

In a traditional steering system the steering wheel turns a steering shaft that in turn is connected to a steering gear that converts the rotation of the steering wheel into a side to side movement of a steering rack that is mechanically connected to the wheels. In contrast, in a steering by wire steering system there is no direct mechanical connection between the steering wheel and the road wheels.

In a steer by wire assembly the steering shaft is omitted, or at least does not mechanically connect the steering wheel to the steering, and instead one or more electric motors are used to steer the road wheels in response to control signals which are in turn responsive to movement of the steering wheel. The motors apply a torque to a part of the steering assembly to turn the road wheels in response to a control signal which is dependent of the position of, or the movement of, a steering wheel which forms part of an assembly known as a handwheel actuator assembly.

To improve the user experience, and in particular to provide appropriate haptic feedback to the driver about the forces at the interface between the tyres and the road, it is known to provide force feedback to the driver of the vehicle by applying a torque to the steering wheel of the handwheel actuator assembly. The feedback torque may be applied by a variety of means, such as an electric motor or an arrangement of springs, dampers and brakes. This can be used to allow the driver to feel the wheels striking a stone or hole, or to lighten the feel at the steering wheel when the tyres are running on a low friction road surface, e.g. a wet or icy road surface.

The term steering wheel in this description should be construed broadly to encompass both a conventional wheel having a generally circular continuous or discontinuous rim that the driver can grip which is supported by a hub, as well as a steering handle such as a pair of opposed hand grips that are supported by the hub that can rotate around a circular path, an arrangement similar to the yokes commonly used in aircraft. The handgrips and hub may form a W, M or U shaped configuration for example. In each case the feedback torque is typically applied to the portion that the driver holds through the hub, by connecting the hub to a generator of the feedback torque.

According to a first aspect the invention provides a handwheel actuator assembly for a steer by wire steering system of a vehicle, the assembly comprising:

a steering wheel having at least one hand grip portion rotatable around an axis of rotation of the steering wheel which can be gripped by a driver, the steering wheel having a hub that supports the hand grip portion; and a feedback torque generator comprising an electric motor which has a stator and a rotor, wherein the rotor is directly or indirectly fixed to and rotates with the hub of the steering wheel and the stator is secured to a fixed part of the vehicle body such that it cannot rotate relative to the vehicle body, characterized in that the motor comprises a brushless permanent magnet Vernier motor.

The Vernier motor may comprise a radial motor, and most preferably an inverted type motor in which the rotor has a larger diameter than the stator. The rotor and stator share a common axis of rotation and face each other across a circumferential air gap. The stator may comprise a plurality of radially outwardly extending slots within which stator windings are laid. This is advantageous compared within a non-inverted motor as the slots of the inverted motor are easier to wind around. The use of a radially outer rotor is also advantageous as the individual poles will be circumferentially larger compared with a non-inverted motor which again may simplify manufacture.

The motor and steering wheel share a common axis of rotation.

Alternatively, the Vernier motor may comprise an axial motor, in which the rotor and stator are not concentric but have substantially the same radius and are arranged alongside each other, spaced along a common axis of rotation, to define an airgap between the rotor and stator.

Whether the rotor is fixed directly to the hub or is fixed indirectly to the hub, the connection between the rotor and hub provide a direct 1:1 gear ratio between the two, the hub therefore rotating at the same speed as the rotor of the motor.

The stator of the Vernier motor may comprise an annular assembly with a hollow centre that defines a space within the stator through which an additional component part of the handwheel assembly passes or within which an additional component part is located.

The additional component part may comprise a wiring harness that connects to a driver information display which in use displays information to the driver. This information may be information about the status of the vehicle, such as speed and location, or infotainment information such as the title of a music track that is playing or a radio station that is playing.

The driver information display may comprise a housing pod and an electronic display located within the housing pod. This may be located within a space bounded by at least one of the steering wheel, a void between the steering wheel and the motor, and the space within the annular stator.

The stator may be fixed to a stator support part which may in use be secured to a fixed part of the vehicle body. The stator support part may comprise a housing for the motor which in use may be secured to a bulkhead of the vehicle or a cross beam that extends across the vehicle between the driver and bulkhead, typically behind a dashboard of the vehicle.

The motor incorporated into the handwheel actuator of the first aspect of the invention comprises a permanent magnet Vernier motor. The skilled person will understand how to identify a motor as a Vernier motor, as distinct from a conventional motor, from the number of stator teeth and the number of rotor poles pairs and their topological arrangement. An excellent summary of the main characteristics of a Vernier motor is given by A. Toba and T. A. Lipo in a paper title "Novel Dual-Excitation Permanent Magnet Vernier Machine", Conference Record, 34$^{th}$ IAS Annual meeting, 1999, pp. 2539-2544. Further explanation of Vernier Motors is given in the earlier paper titled "Vernier Motor and its design", IEEE Trans. On Power Apparatus and Systems, Vol. 82, No. 66, 1906, pp 343-349 that deals with Vernier motors without permanent magnets.

The rotor of a permanent magnet motor typically contains a plurality of magnets forming a magnetic field within the air gap between the rotor and stator having $p_r$ pole pairs. The stator has a number of teeth facing radially toward the rotor, and a corresponding number of slots, $N_s$. In a permanent magnet Vernier motor, the number of rotor pole pairs $p_r$ and stator slots $N_s$ are related by equation (1) where $p_s$ is the number of pole pairs created by the stator windings when energized.

$$p_r = N_s \pm p_s \tag{1}$$

In a preferred arrangement the motor comprises a stator with 6 teeth and a rotor with 5 pole pairs. The stator windings are arranged such that they create a magnetic field having one north and one south pole i.e. one pole pair, and therefore $p_s=1$.

In another preferred arrangement, the motor comprises a rotor with 11 pole pairs and a one pole pair magnetic field created by a stator having 12 teeth The motor may have three phases but may have fewer or more phases.

The rotor or stator may be skewed or un-skewed.

The reader will appreciate that the torque feedback actuator of the invention shares a common axis of rotation with the steering wheel, so that the two move together around that axis at the same rotational speed.

The hub may be secured to the rotor through a stub shaft, the shaft having an axis of rotation that lies on the axis of rotation of the hub and the rotor. The stub shaft may pass through or extend only partially into the space defined by the centre of the stator.

The steering wheel hub may include a boss which fits onto an end of the stub shaft. Splines on the stub shaft may engage complimentary splines on the boss to prevent relative rotation of the stub shaft and steering wheel.

The motor may be offset axially from the steering wheel.

The stub shaft may be supported by at least one, and preferably two, bearing assemblies. The bearing assemblies may lie on the side of the motor nearest the driver, or may lie on the side of the motor furthest from the motor. One bearing assembly may be located on each side of the motor.

Where the two or more bearing assemblies are located on the side of the motor nearest the driver, a shroud that supports one or more column switches and/or a rotary ("airbag") connector to the steering wheel may surround the stub shaft.

The stub shaft may be fixed to a connecting piece which is in turn fixed to the rotor. The steering wheel in such an arrangement is indirectly connected to the rotor through the stub shaft and then through the housing. The stub shaft may be fixed to the bracket using an interference fit, or by welding of the housing to the stub shaft, or fixed using adhesive, clinching, riveting, using screws etc. The skilled person will appreciate that that this is not an exhaustive list. Splines on the stub shaft may connect to splines of the bracket. The bracket may, alternatively, be integral to the stub shaft.

The bearings that support the stub shaft may be journaled to a housing that comprises a first cylindrical can that extends axially along a portion of the stub shaft.

The housing may include a radial end wall that connects the first cylindrical can to a second, larger, cylindrical can that surrounds the outer periphery of the rotor. The larger can may connect to a further radial end wall on the opposite side of the motor to the first radial end wall of the housing.

The first cylindrical can may be located on which side of the motor the bearings are located.

The housing may surround both the motor and the bracket that fixes the motor to the stub shaft.

The assembly may include a travel limiter which comprises a first part that is fixed relative to the body of the vehicle that in use engages with a second part that is fixed to the rotor of the motor when the rotor reaches a predefined end of rotational travel.

The rotor and hence steering wheel in such an arrangement may thereby be limited to rotate through less than 360 degrees.

The first part may comprise a radially inwardly projecting lug on the inside of the outer wall of the housing that engages a corresponding stopper on the rotor.

The stopper may comprise a radially projecting part of the rotor, or an end face of a circumferential groove that extends part of the way around the circumference of the rotor within which the lug of the first part is located.

In an alternative arrangement, the stub shaft may be omitted. The hub of the steering wheel may instead be fixed directly to the rotor of the motor or may be fixed to the rotor of the motor through a mounting bracket.

The rotor may be supported by one or more bearing assemblies that are journaled to a housing for the motor. One bearing assembly may be provided on each side of the motor, i.e. on the side facing away from the steering wheel and on the side facing the steering wheel.

The rotor may include a portion that projects down each side of the rotor to meet the bearing assemblies. One of these portions may be connected to the mounting bracket for the steering wheel.

The housing for the motor may enclose the outer periphery of the motor and the two sides and the two bearing assemblies may be journaled to the housing. The housing provides the connection of the handwheel assembly to the fixed part of the vehicle.

Providing an arrangement with no stub shaft leaves room through the centre of the motor for connection of electrical wiring to any additional components that are located on the side of the motor nearest the driver within a space bounded by the grip portion of the steering wheel and the hub.

A fixed bracket may be fitted to the end of the hollow space. This may be fitted after the handwheel is attached to the motor. The fixed bracket can support components that are located in the centre of the handwheel and that do not rotate when the steering wheel is rotated. These components may include one or more components selected from a list comprising of a driver airbag, control switchgear and a driver display The applicant envisages that the additional components may include or comprise a display. The support will not move with respect to the motor, but the entire motor/wheel assembly can be mounted on a support that permits it to retract away from the driver.

It is envisaged that the handwheel apparatus may be used in a vehicle which has an autonomous driving mode. In that mode the vehicle may drive itself (steer, accelerate and brake) without any driver input.

An angle sensor may be provided which outputs an angle signal indicative of the angular position of the steering wheel.

Where a stub shaft is provided, the angle sensor may be fixed to the end of the stub shaft furthest from the steering wheel. The angle sensor may, for example, comprise a target magnet fixed to the stub shaft or steering wheel and at least one sensing element that can determine the positon of the element, but other sensors could be used. A Hall Effect sensor may be used as a suitable sensing element.

Where a stub shaft is not provided, the angle sensor may comprise a ring of magnetic elements secured to the rotor or steering shaft or another part that rotates along with at least one sensing element that detects the movement of the ring of magnets.

According to a second aspect the invention provides a handwheel actuator assembly for a steer by wire steering system of a vehicle, the assembly comprising:

a steering wheel having at least one hand grip portion rotatable around an axis of rotation of the steering wheel which can be gripped by a driver, the steering wheel having a hub that supports the hand grip portion; and a feedback torque generator comprising an electric motor which has a stator and a rotor, wherein the rotor is directly or indirectly fixed to and rotates with the hub of the steering wheel and the stator is secured to a fixed part of the vehicle body such that it cannot rotate, characterized in that the motor comprises an annular motor having a hollow centre and in that an additional non-rotational component of the handwheel assembly is located within the hollow centre of the stator.

The hollow centre of the motor may accommodate an additional component that comprises a wiring harness. This may be connected to a driver display/switches/airbag is located within the space at least partially bounded by the inside the steering wheel. The hub may comprise one or more dished spokes that extend around the outside of the display to directly or indirectly connect the hand grip portion to the motor rotor.

The additional components may comprise a part of a wiring loom that passes through the motor.

The hollow centre of the motor or the space bounded by the steering wheel, or both may accommodate an airbag which does not rotate with the steering wheel. The airbag may be located partially within the motor hollow centre and partially within the space bounded by the steering wheel.

The additional components may comprise a fixed hub that supports a display or airbag or other item in the space bounded by the steering wheel.

The handwheel assembly of the second aspect may include any of the features described earlier in relation to the handwheel assembly of the first aspect of the invention.

There will now be described by way of example only, three embodiments of a handwheel actuator assembly that falls within the scope of at least one aspect of the present invention.

Figure 1:
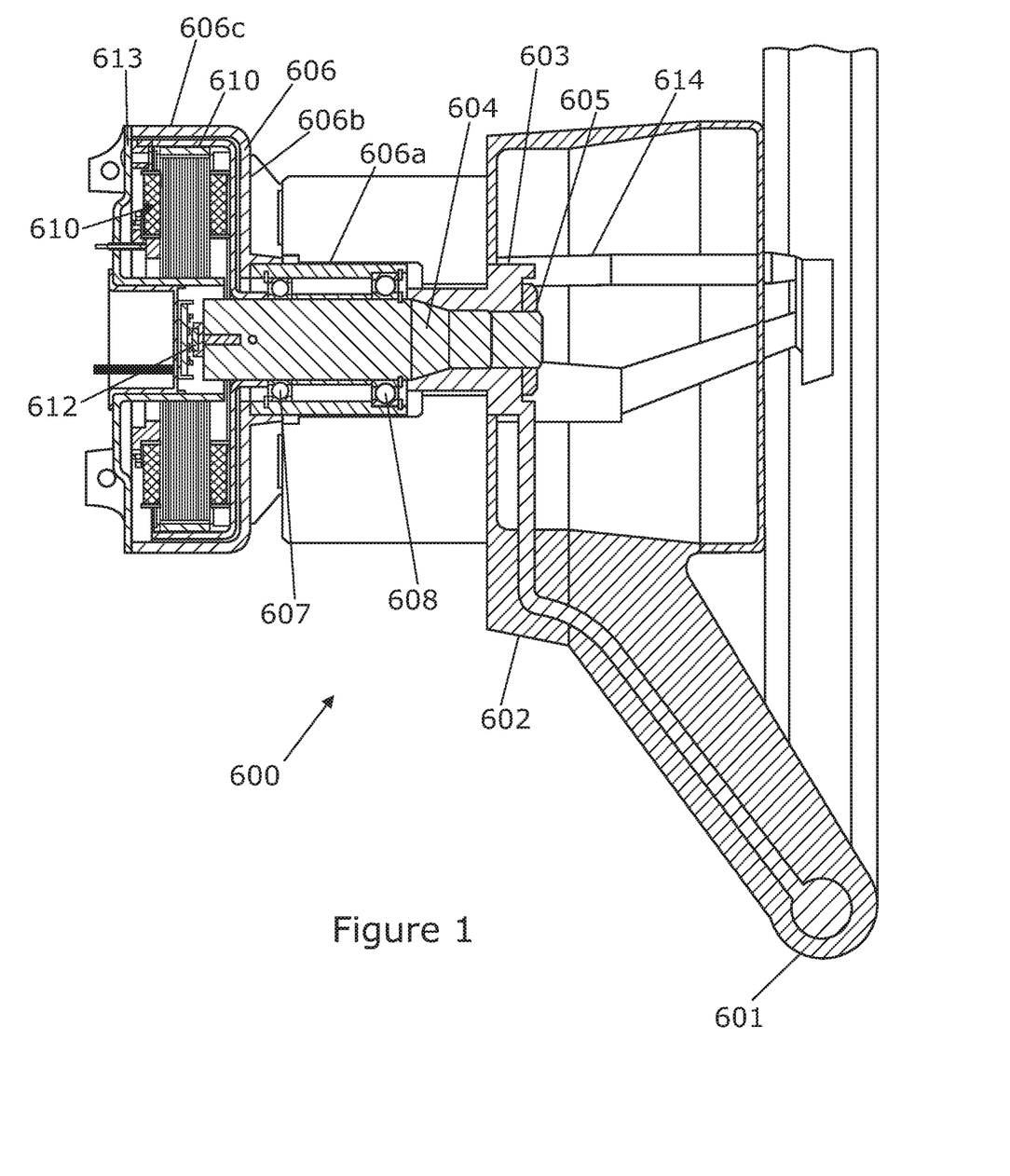
FIG. 1 is a view in cross section from the side of a first embodiment of a handwheel assembly according to at least one aspect of the invention
Figure 2:
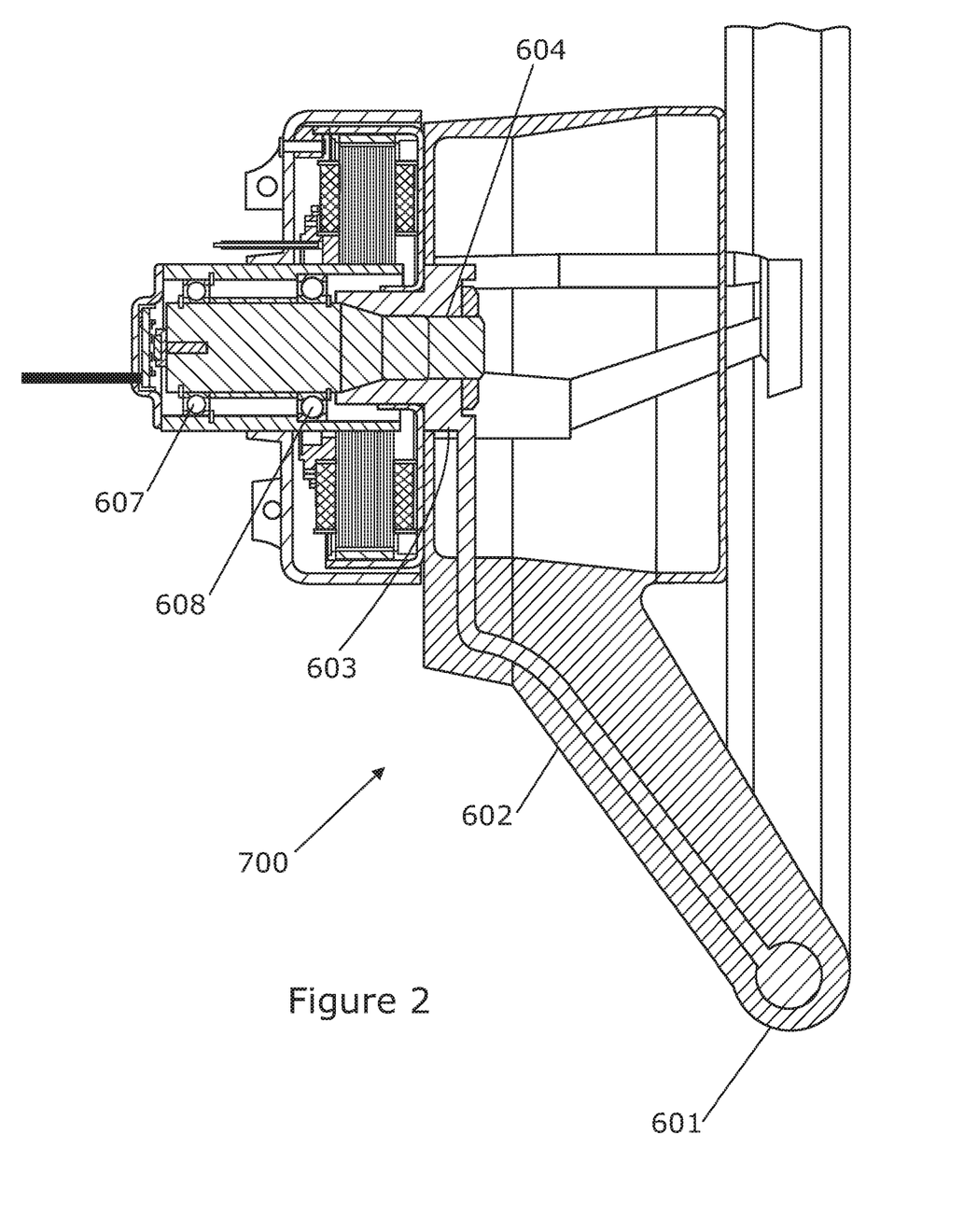
FIG. 2 is a view in cross section from the side of a second embodiment of a handwheel assembly according to at least one aspect of the invention
Figure 3:
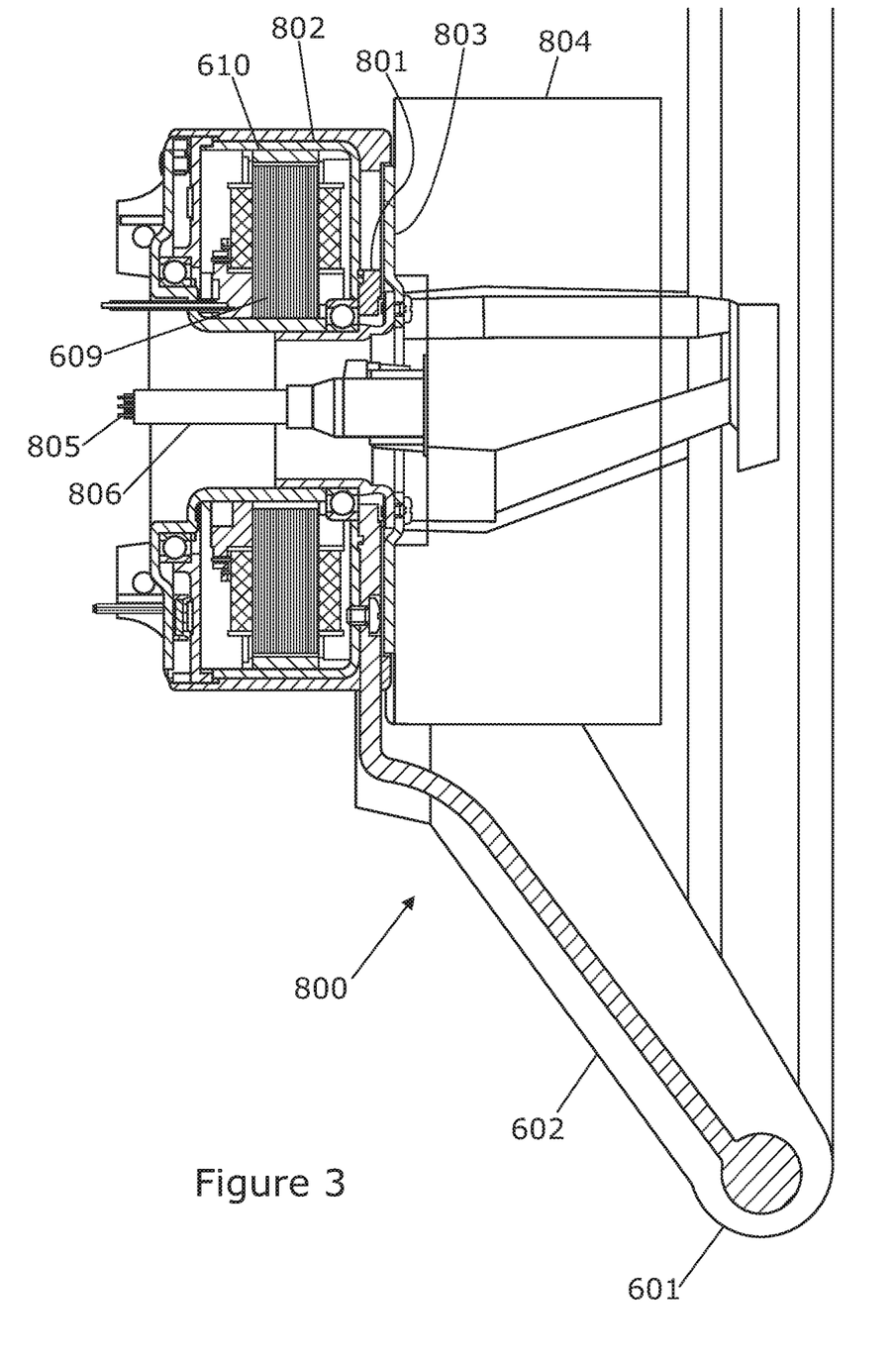
FIG. 3 is a view in cross section from the side of a third embodiment of a handwheel assembly according to at least one aspect of the invention.

A number of different embodiments of a handwheel actuator assembly in accordance with the present invention are shown in FIGS. 1 to 3 of the accompanying drawings. Common to each embodiment is an inverted permanent magnet Vernier motor, of the kind having an annular rotor which rotates around a fixed internal stator. Also common to each motor is the use of a hollow annular stator, defining a passage within the bounds of the stator allowing one or more components to be located within or to extend axially through the stator of the motor.

Figure 4:
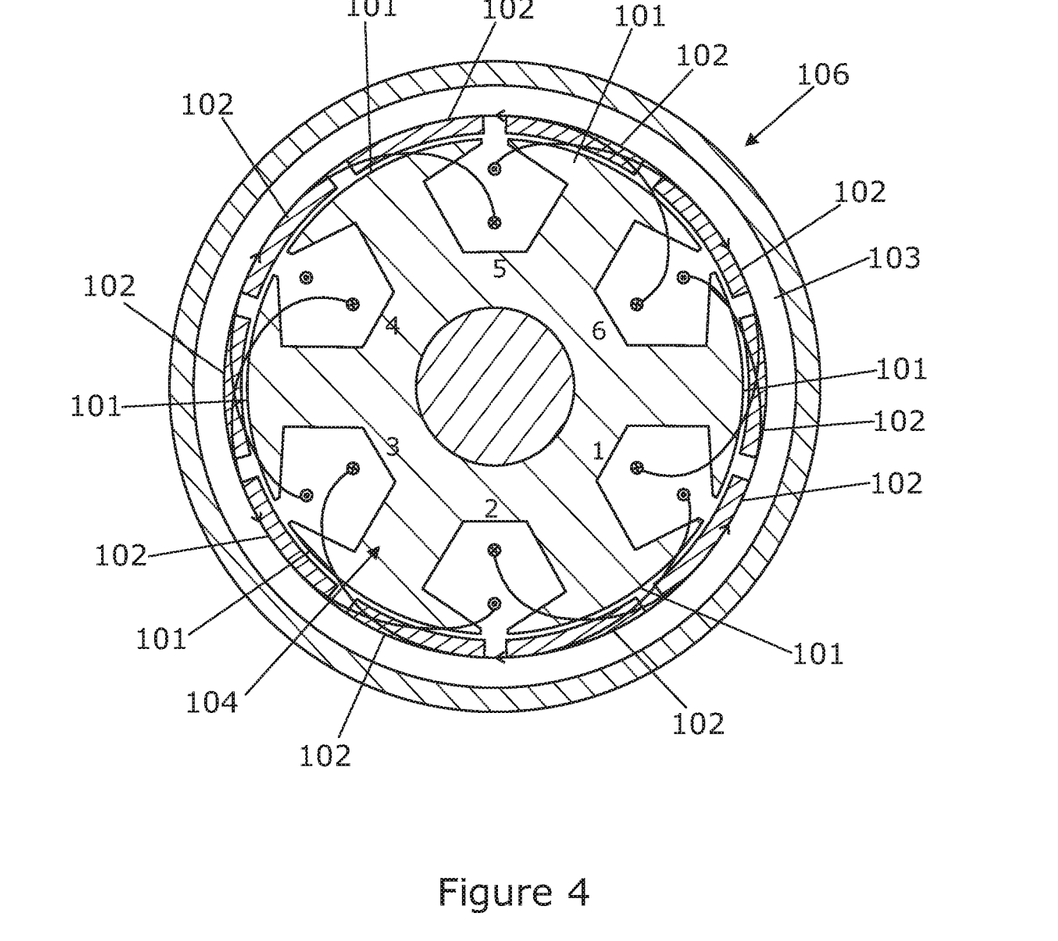
FIG. 4 is a view in cross section of an inverted radially brushless permanent magnet Vernier motor with 6 stator teeth and 5 rotor pole pairs.
Figure 5:
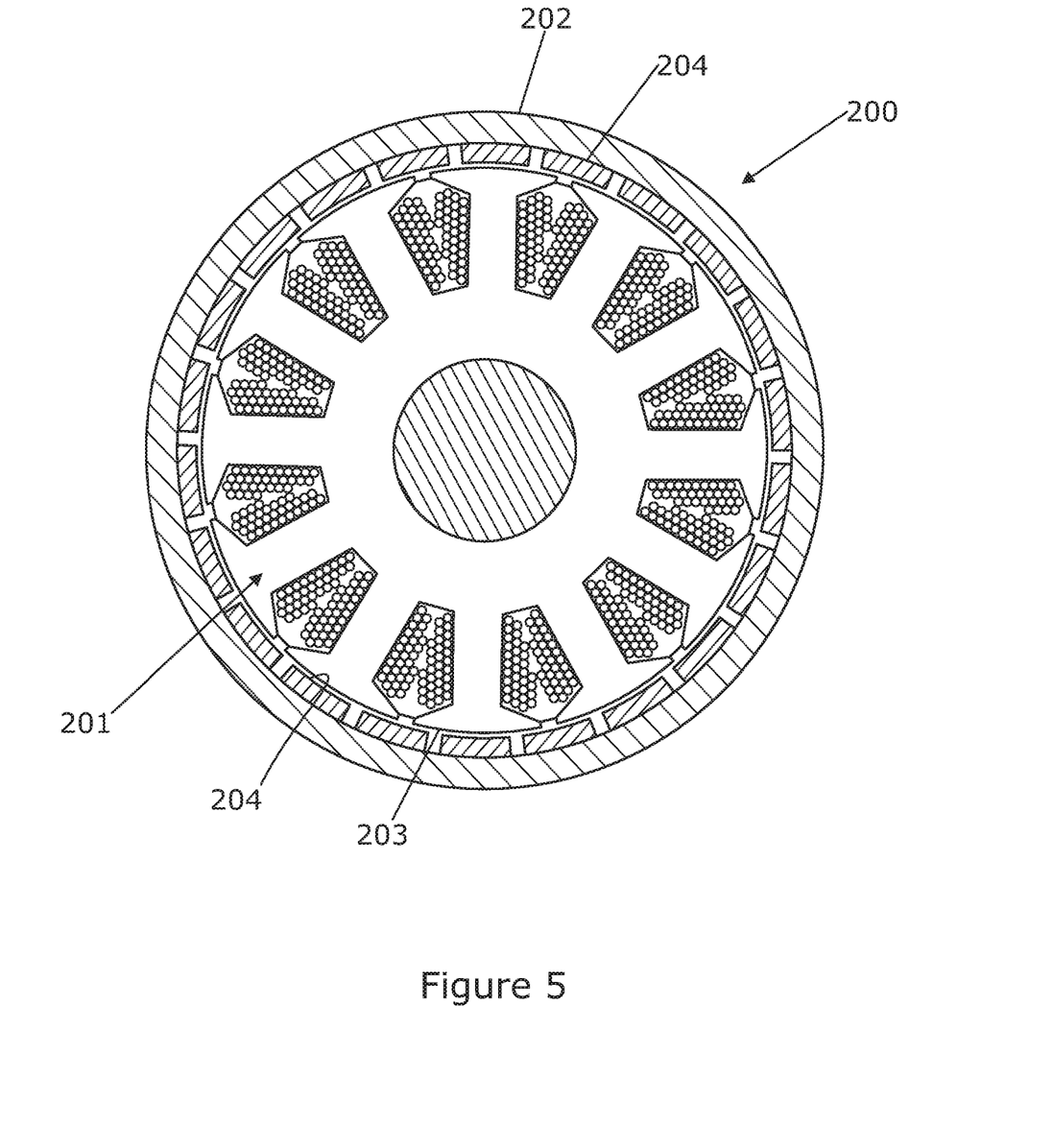
FIG. 5—is a view in cross section of an inverted radially brushless permanent magnet Vernier motor with 12 stator teeth and 11 rotor pole pairs.
Figure 8:
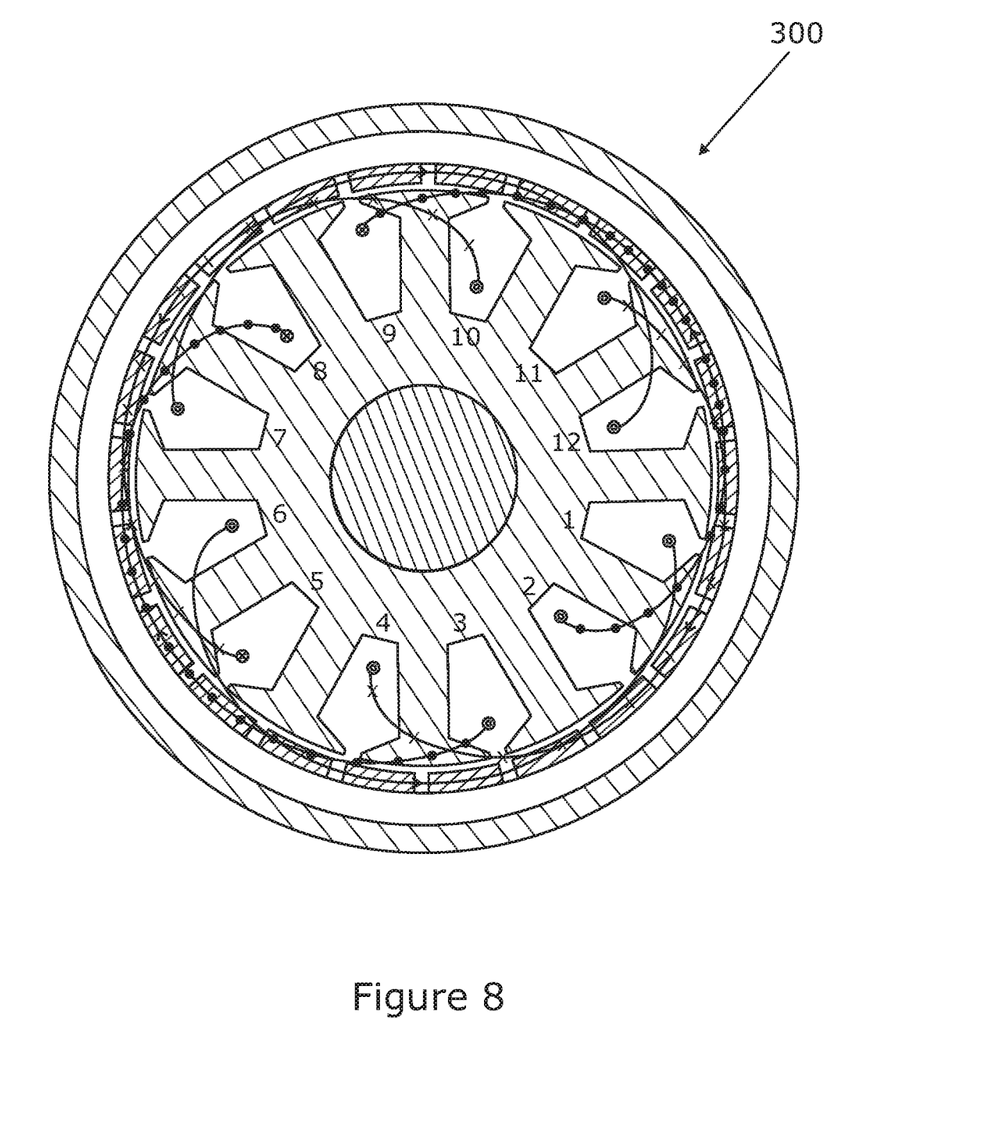
FIGS. 8 to 10 are views in cross section of alternative wiring arrangements for an inverted radially brushless permanent magnet Vernier motor with 12 stator teeth and 11 rotor pole pairs.
Figure 9:
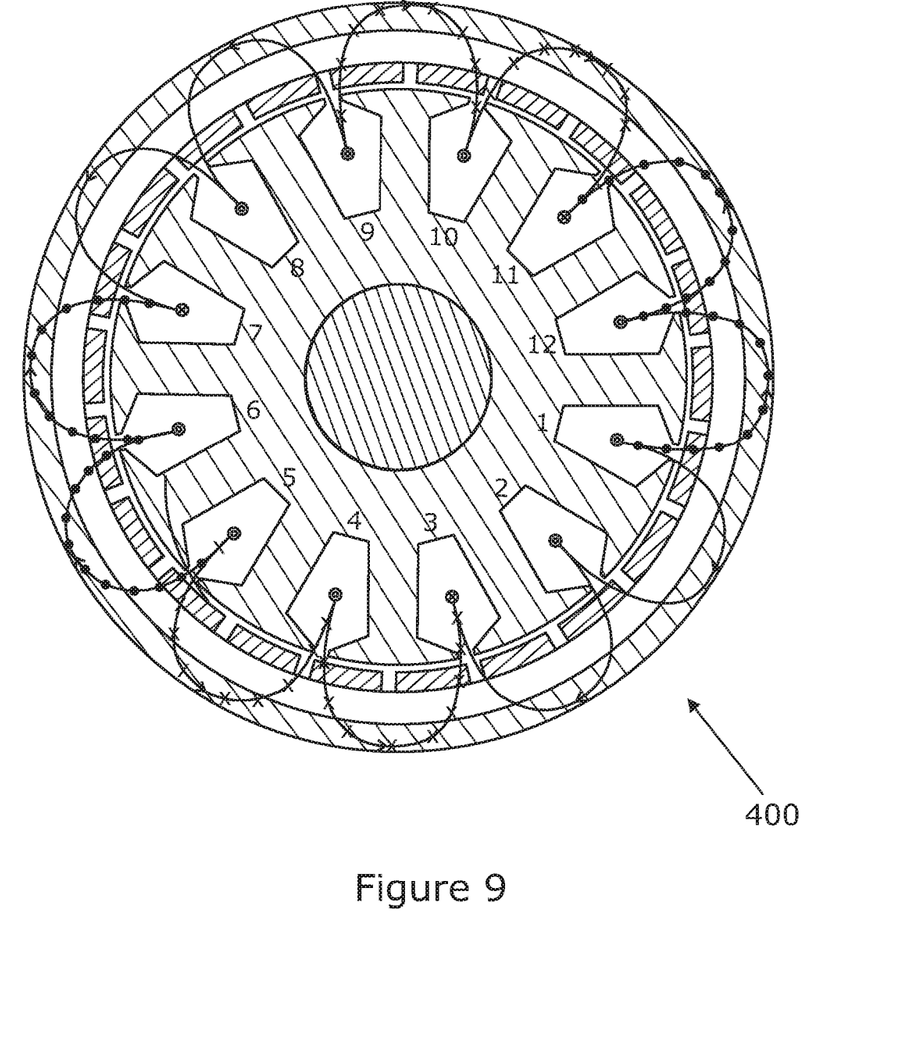
Figure 10:
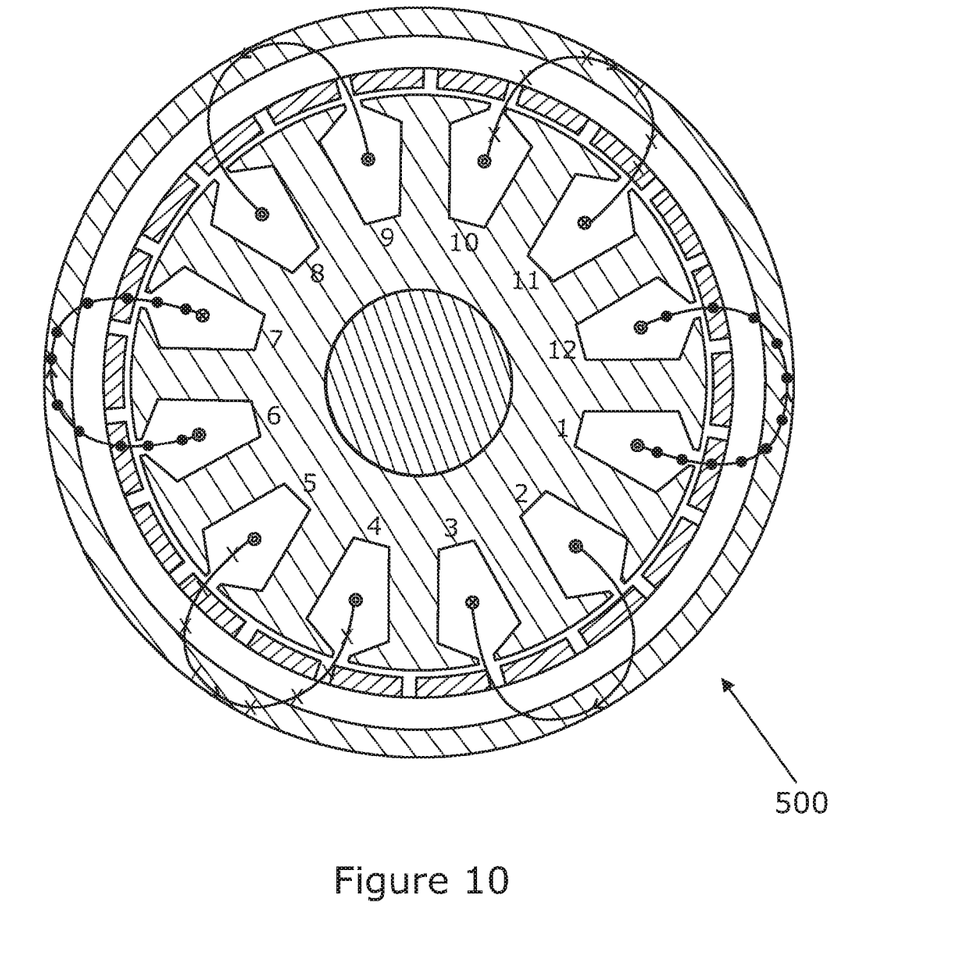

Two especially advantageous motor topologies of a radial motor arrangement are illustrated in FIGS. 4 and 5 of the accompanying drawings, and various alternative winding arrangements for the motor of FIG. 4 are shown in FIGS. 8, 9 and 10. The motors of FIGS. 4 and 5 differ in the number of stator teeth and the number of rotor pole pairs, and in other consequential changes to the windings of the motor. In each case, the motors in the examples are three phase fully pitched wound stator designs. In FIG. 4 a motor 100 having a stator 103 with 6 stator teeth 101 and 5 pairs of rotor poles 102 is shown. FIG. 5 shows a motor 200 with a stator 201 and rotor 202 that has 12 stator teeth 203 and 11 pairs of pole rotors 204.

The motor can be wound in a number of configurations. FIG. 8 shows one arrangement of the phase windings of a motor 300. The interconnecting wires, marked with an arrow, for one phase are shown with a solid black line, and for the other two phases are respective marked with a crossed line or a dotted line. FIG. 9 shows a similar 22-pole, 12 slot Vernier motor 400 but with a double layer concentrated (single tooth) winding arrangement. Although producing an air gap magnetic field with less first harmonic i.e. one north and one south pole relative to that available from the fully-pitched winding arrangement, the end windings are not overlapping. This saves space at the end of the stator. It also reduces the possibility of windings from different phases touching each other. This aids reliability and reduces the probability of problems arising from short circuits between phases. A further alternative winding arrangement for the pole-slot combination of a motor 500 that contains some first harmonic in the magnetic field is the single layer winding is shown in FIG. 10. This has just one winding per slot. The single layer winding provides inherent physical separation of coils of different phases within a slot. This saves space that would otherwise be taken by isolating barriers. Such isolating barriers or physical separation is typically desired in a motor used in a safety critical application such as electric power steering. Halving the number of coils compared with the double layer winding further reduces the number of connections that may be necessary and allows a number of different coil assembly approaches to be more readily utilised.

Other motor topologies can be used. In another arrangement, shown in FIG. 7 of the drawings, an axial motor may be provided rather than a radial motor.

The main component parts of the Vernier motors are permanent magnets mounted onto the peripheral surface of an annular support that defines the rotor, although the magnets may also be recessed or buried within or below the surface of the rotor. These magnets face radially towards the axis of the rotor so they face the stator. The magnets are spaced equi-distant from each adjacent magnet around the rotor.

The stator comprises an annular support or back iron that is located within the rotor, the rotor therefore having a larger radius than the stator. The stator annular support defines a set of stator teeth around which stator windings are wound. The stator teeth are spaced equi-distant from each adjacent stator tooth around the back iron. An air gap is defined between the stator and rotor.

The applicant has appreciated that a Vernier motor is well suited to a handwheel actuator assembly because it can produce a high torque at low rotational speeds, removing the need for any mechanical gearing between the motor and steering wheel for a given size and cost of motor.

A first embodiment of a handwheel actuator assembly 600 for a steer by wire steering system is shown in FIG. 2. The assembly comprises a steering wheel 601 having a relatively thin generally round rim that defines a hand grip portion that is rotatable around an axis of rotation of the steering wheel. The rim can be gripped by a driver either or both hands in a conventional manner, and the driver can rotate the wheel around a central axis of rotation. Many other forms of handgrip may be provided within the scope of this invention, with the steering wheel not being required to have a round rim.

The steering wheel 601 has a hub 602 or armature that comprises a single dished arm or spoke that has a first end connected to the rim and a second end that is connected to a boss 603. Multiple spokes may be provided, depending on the style of the hand grip and the rigidity of the steering wheel that is required and the invention is not to be limited to one spoke. The boss 603 is located on the axis of rotation of the steering wheel 601 and supports the hand grip portion. A recess in the boss 603 has a set of radially inwardly facing splines or other locating features and is pressed onto the end of a stub shaft 604 which has a set of complimentary radially outwardly projecting splines in a conventional manner for fixing a steering wheel to a steering shaft. The splines ensure that the steering wheel 601 when rotated will create a corresponding rotation of the stub shaft 604. A nut 605 prevents the steering wheel hub being accidentally pulled off the stub shaft by the driver.

As seen in FIG. 1, the stub shaft 604 extends along the axis of rotation of the steering wheel in a direction away from the driver of the vehicle. The shaft passes through a housing 606 which has a cylindrical can 606a that carries on an inner wall a pair of bearing assemblies 607,608 that support the stub shaft at axially spaced locations. One end of the cylindrical can 606a is connected to a radially extending end wall 606b of the housing which in turn is connected at its outermost peripherally to a second cylindrical can 606c. The second can 606c extends away from the first can, and defines a portion of the housing within which a feedback torque generator that includes a Vernier motor is located. The motor may be of the kind shown in FIG. 4 or 5, or may be some other configuration of Vernier motor.

The stator 609 of the motor is fixed to the housing 606 and the rotor 610 of the Vernier motor is fixed to a connector 611 which is fixed to the stub shaft on the side of the motor nearest the steering wheel. As the rotor 610 rotates, the connector 611 and in turn the stub shaft 604 rotate, which finally causes the steering wheel to rotate. Applying a torque to the motor can therefore be used to turn the steering wheel or to apply a torque that resists partially the torque applied to the steering wheel by the driver.

Also shown is an angle sensor 612 which determines the angular position of the steering wheel from the angle of the stub shaft 604. This sensor 612 is fixed to the end of the stub shaft furthest from the steering wheel. An electrical cable carrying signals output from the sensor passes through the hollow motor away from the steering wheel, for connection to an electrical circuit located elsewhere on the vehicle. This circuit includes a motor controller which controls a motor drive circuit. The motor drive circuit applies suitable drive currents to the windings of the motor so as to cause the motor to apply a required feedback torque to the steering wheel.

Also shown in FIG. 1 is a travel limiter 613 which limits the range of angular movement of the steering wheel 601 to less than one complete revolution. This comprises a lug on the radially inner wall of the second can 606c that engages a radially outwardly projecting lug on the rotor.

The handwheel actuator assembly 600 of FIG. 1 locates the steering wheel 601 some distance axially from the motor, and this conveniently provides a space within which a shroud 614 that carries one or more items of steering column switchgear can be located. The items may include an indicator switch, a wiper switch, or perhaps a gear selection switch. By switch we mean any user operable device which enables an electrical control signal to be altered or generated.

A second embodiment of a handwheel actuator 700 is shown in FIG. 2. This includes many of the same components as the embodiment of FIG. 1 and for these components the same reference numerals have been used for convenience. The description of the function of the components in the first embodiment apply equally to the second embodiment so for efficiency will not be repeated.

The second embodiment differs from the first embodiment principally in the stub shaft 604 extending right the way through the motor to be supported by two bearing assemblies 607,608 that are on the opposite side of the motor to the steering wheel.

As a consequence of this change, the rotor can be connected directly to the boss of the steering wheel rather than to the stub shaft 604. This provides an axially more compact assembly, allowing the space between the steering wheel and the motor to be minimized or, as shown, entirely removed. Indeed, this may allow the motor rotor to be connected directly to the steering wheel hub.

A third embodiment of a handwheel assembly 800 is shown in FIG. 3. Again, the same reference numerals have been used as for FIGS. 1 and 2 to identify like components.

In the third embodiment a stub shaft is not used, and the space in the centre of the motor stator 609 is enlarged. The steering wheel 601 is fixed to part of the rotor 610 of the motor through a spacer 801 which engages a connector part 802. The steering wheel boss can be omitted also.

The arrangement of FIG. 3 leaves an open space enclosed by the steering wheel rim and hub and the inside of the motor within which an additional component can be located. As shown the additional component comprises a display housing 804 which contains an electronic driver display. The display in use presents information to the driver such as vehicle status information. A connector 805 for the display is connected to a wiring harness 806 that passes through the centre of the motor.

The display housing is fixed in place by a bracket 803 that is fixed to a support for the motor stator. The display 804 can be removed from the bracket, and also the steering wheel can be removed from the rotor. Access to the fixings to permit removal can be easily made from the side of the motor facing the driver, allowing the display and wheel to be removed with the motor secured in place on the vehicle. This also allows the steering wheel to be fitted after the motor is fixed to the vehicle if required during vehicle assembly.

Figure 7:
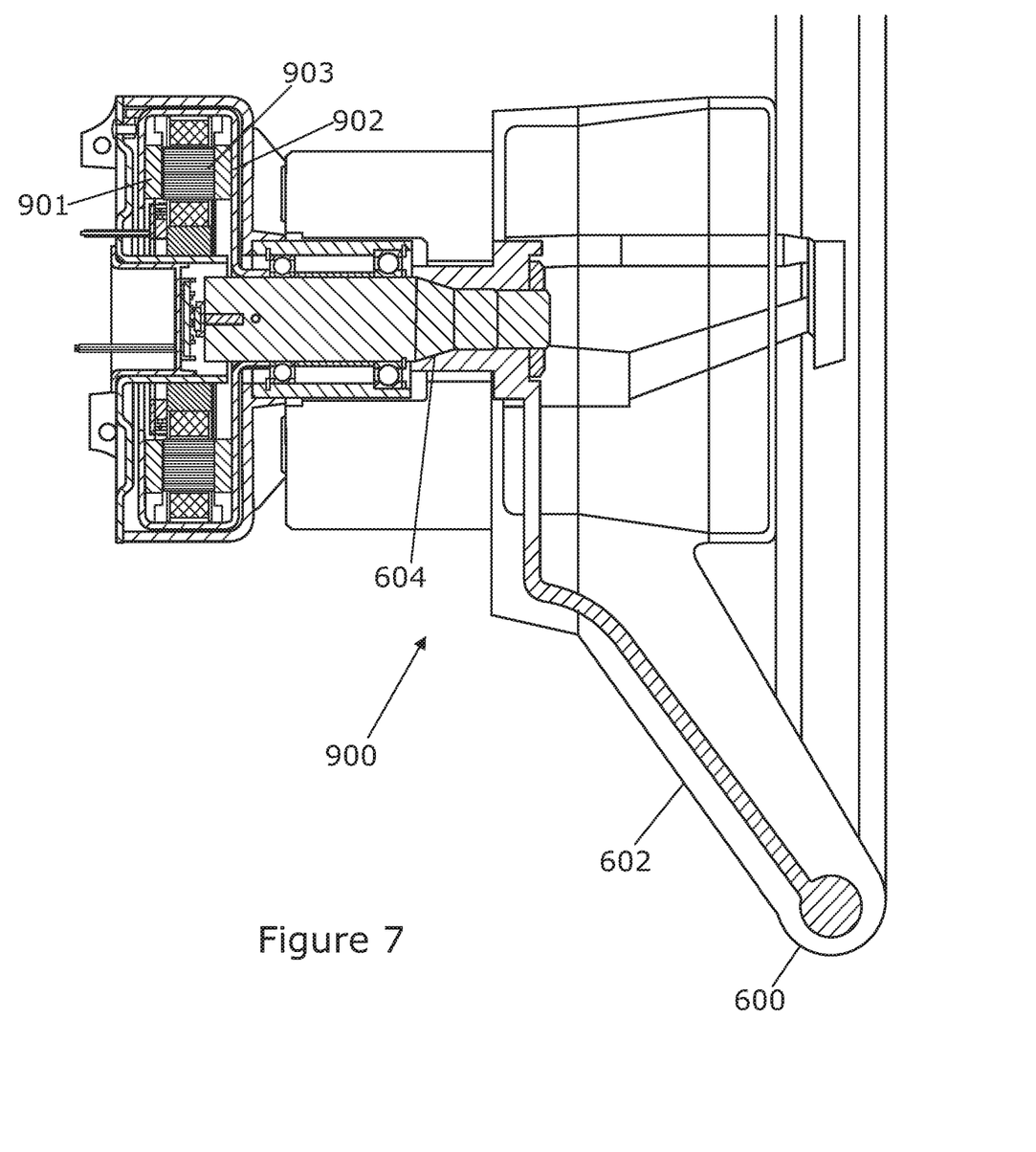
FIG. 7 is a view in cross section from the side of a fourth embodiment of a handwheel assembly according to at least one aspect of the invention which includes an axial motor.

In another embodiment 900 of a handwheel assembly shown in FIG. 7, an axial motor may be provided instead of a radial motor. In this case, the rotor and stator and not arranged concentrically around a common axis, but instead are spaced along a common axis. Here it can be seen that the rotor has two parts 901,902 that sandwich a stator 903.

Figure 6:
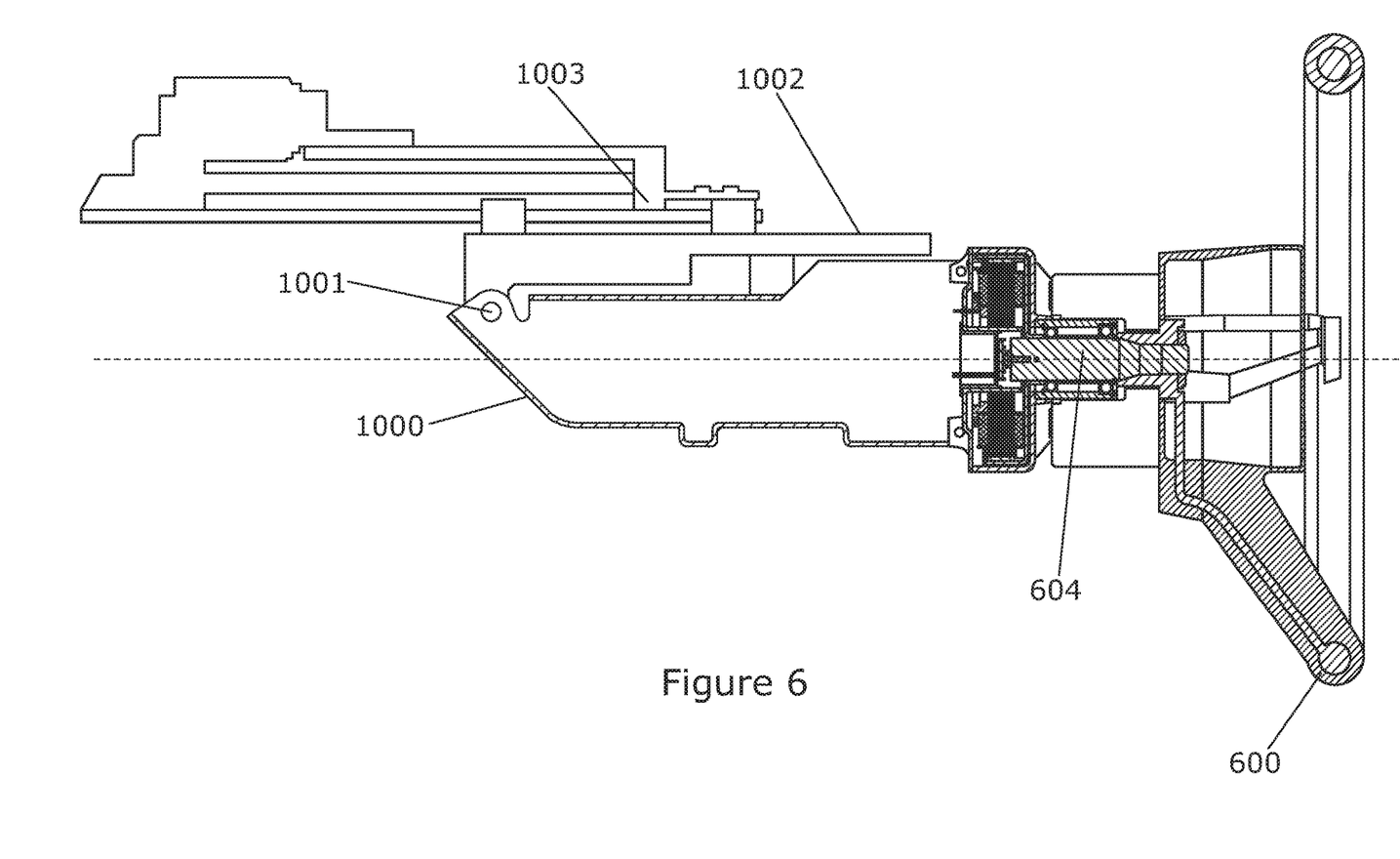
FIG. 6 is a view in cross section from the side of a support assembly for mounting a handwheel assembly to a vehicle body enabling it to retract in the event of a crash.

For each of the four embodiments, the handwheel actuator assembly may be connected to a support structure as shown in FIG. 6 that enables the positon of the steering wheel to be adjusted for reach, and to enable the steering wheel to move away from the driver's seat towards a front end of the vehicle in the event of a frontal collision that causes a rapid deceleration of the vehicle. This enables the wheel to be actively retracted away from the driver, or to move with the body of an unrestrained driver when they strike the steering wheel or strike an inflated airbag fixed to the steering wheel. In each case the movement can help absorb kinetic energy from the driver as is known in the art of steering wheel assembly design.

The support structure comprises a rake support bracket 1000 that can pivot around a pivot axle 1001 that enables the rake angle of the steering wheel 600 to be adjusted. This rake support bracket is in turn connected to a moving reach bracket 1002, that is in turn fixed to the vehicle body through a mounting bracket 1003. In the context of this description, where an item is described as being connected to a fixed part of the vehicle this refers to any part which during normal use of the handwheel actuator does not rotate or otherwise move relative to the vehicle body.

The invention claimed is:

1. A handwheel actuator assembly for a steer by wire steering system of a vehicle, the assembly comprising:
    a steering wheel having at least one hand grip portion rotatable around an axis of rotation of the steering wheel which can be gripped by a driver, the steering wheel having a hub that supports the hand grip portion;
    a housing;
    a stub shaft having one end rotatably supported in the housing and another end fixed to the hub such that the stub shaft rotates with the hub around the axis; and
    a feedback torque generator comprising an electric motor which has a stator and a rotor, the stator and the rotor being in the housing, wherein the rotor is directly or indirectly fixed to the stub shaft and rotates with the hub of the steering wheel via the stub shaft, and the stator is secured to a fixed part of the vehicle body such that it cannot rotate relative to the vehicle body,
    wherein the electric motor comprises a brushless permanent magnet Vernier motor.

2. The handwheel actuator assembly according to claim 1 in which the Vernier motor comprises an inverted radial motor in which the rotor has a larger diameter than the stator.

3. The handwheel actuator assembly according to claim 1 in which the connection between the rotor and hub provides a direct 1:1 gear ratio between the two so that in use the hub rotates at the same speed as the rotor of the Vernier motor.

4. The handwheel actuator assembly according to claim 1 in which the stator of the Vernier motor comprises an annulus with a hollow centre that defines a space within the stator through which an additional component part of the handwheel assembly passes or within which an additional component part is located.

5. The handwheel actuator assembly according to claim 4 in which the additional component part comprises a wiring harness that connects to a driver information display which in use displays information to the driver.

6. The handwheel actuator assembly according to claim 1 in which the stator is fixed to a stator support part which in use is secured to a fixed part of the vehicle body.

7. The handwheel actuator assembly according to claim 1 in which the Vernier motor comprises a stator with 6 stator teeth and a rotor with 5 pole pairs.

8. The handwheel actuator assembly according to claim 1 in which the Vernier motor comprises a stator with 12 stator teeth and a rotor with 11 pole pairs.

9. The handwheel actuator assembly according to claim 1 in which the hub is secured to the rotor through a stub shaft, the shaft having an axis of rotation that lies on the axis of rotation of the hub and the rotor.

10. The handwheel actuator assembly according to claim 9 in which the stub shaft is supported by two bearing assemblies.

11. The handwheel actuator assembly according to claim 1 which further includes a travel limiter which comprises a first part that is fixed relative to the body of the vehicle that in use engages with a second part that is fixed to the rotor of the Vernier motor when the rotor reaches a predefined end of rotational travel.

12. The handwheel actuator assembly according to claim 1 in which the hub of the steering wheel is fixed to the rotor of the Vernier motor through a mounting bracket.

13. A handwheel actuator assembly for a steer by wire steering system of a vehicle, the assembly comprising:
    a steering wheel having at least one hand grip portion rotatable around an axis of rotation of the steering wheel which can be gripped by a driver, the steering wheel having a hub that supports the hand grip portion;
    a housing;
    a feedback torque generator comprising an electric motor which has a stator and a rotor, the stator and rotor being in the housing, the stator being secured to a fixed part of the vehicle body such that the stator cannot rotate relative to the vehicle body; and
    a connector separate from and in the housing, the connector directly or indirectly fixing the rotor to the steering wheel such that both the connector and the rotor rotate with the steering wheel;
    wherein the electric motor comprises an annular motor having a hollow centre and in that an additional non-rotational component of the handwheel assembly is located within a hollow centre of the stator.

14. The handwheel actuator assembly according to claim 13 in which the hollow centre internal space may accommodate an additional component that comprises a wiring harness for a display that is located within a void defined by the steering wheel.

15. The handwheel actuator assembly according to claim 14 in which the hub comprises one or more dished spokes that extend around the outside of the display.

16. The handwheel actuator assembly according to claim 1 in which the housing is configured to be secured to the fixed part of the vehicle body such that the housing cannot rotate relative to the vehicle body, the stator being secured to the housing and to the fixed part via the housing.

17. The handwheel actuator assembly according to claim 1 in which the housing is configured to be secured to the fixed part of the vehicle body the rotor rotating with the hub of the steering wheel relative to the housing.

18. The handwheel actuator assembly according to claim 1 in which the housing is configured to be secured to a fixed part of a vehicle body such that the housing cannot rotate relative to the vehicle body.

19. The handwheel actuator assembly according to claim 13 in which an entirety of the connector is in the housing.

20. A handwheel actuator assembly for a steer by wire steering system of a vehicle, the assembly comprising:
- a steering wheel having at least one hand grip portion rotatable around an axis of rotation of the steering wheel which can be gripped by a driver, the steering wheel having a hub that supports the hand grip portion;
- a housing separate from the hub of the steering wheel;
- a stub shaft having one end rotatably supported in the housing and another end fixed to the hub such that the stub shaft rotates with the hub around the axis; and
- a feedback torque generator comprising an electric motor which has a stator and a rotor, the stator and the rotor being in the housing, the rotor being directly or indirectly fixed to and rotating with the hub of the steering wheel, the stator being secured to a fixed part of the vehicle body such that it cannot rotate relative to the vehicle body;
- wherein the electric motor comprises a brushless permanent magnet Vernier motor.

\* \* \* \* \*